(12) United States Patent
Kristensen (10) Patent No.: US 12,262,852 B2
(45) Date of Patent: Apr. 1, 2025

(54) EGG BREAKING APPARATUS AND A METHOD FOR INCREASING THE YIELD OF AN EGG BREAKING PROCESS

(71) Applicant: Sanovo Technology A/S, Odense (DK)

(72) Inventor: Jens Kristian Sonderby Kristensen, Odense (DK)

(73) Assignee: Sanovo Technology A/S, Osense SØ (DK)

( * ) Notice: Subject to any disclaimer, the term of this patent is extended or adjusted under 35 U.S.C. 154(b) by 298 days.

(21) Appl. No.: 17/760,026

(22) PCT Filed: Feb. 7, 2020

(86) PCT No.: PCT/DK2020/050031
§ 371 (c)(1),
(2) Date: Aug. 3, 2022

(87) PCT Pub. No.: WO2021/155893
PCT Pub. Date: Aug. 12, 2021

(65) Prior Publication Data
US 2023/0062050 A1    Mar. 2, 2023

(51) Int. Cl.
*A47J 43/14* (2006.01)
*A23J 1/08* (2006.01)

(52) U.S. Cl.
CPC .............. *A47J 43/145* (2013.01); *A23J 1/08* (2013.01)

(58) Field of Classification Search
CPC ................... A47J 43/145; A23J 1/08
See application file for complete search history.

(56) References Cited

U.S. PATENT DOCUMENTS 1,985,320 A * 12/1934 Giveen ............... A47J 43/145
  99/582
2,966,184 A * 12/1960 Willsey ............... A47J 43/145
  99/582

(Continued)

FOREIGN PATENT DOCUMENTS

CN    201192063 Y    2/2009
CN    104323722 A    2/2015

(Continued)

OTHER PUBLICATIONS

International Search Report, dated Oct. 8, 2020, 12 pages, issued in PCT Application No. PCT/DK2020/050031.

(Continued)

*Primary Examiner* — Anthony J Weier
(74) *Attorney, Agent, or Firm* — AVEK IP, LLC (57) ABSTRACT

An egg breaking apparatus for breaking eggs having shell and contents including yolk and albumen, includes a plurality of egg breaking devices, each adapted for holding, breaking and opening a single egg at a time, and an albumen collection unit for collecting albumen remaining on shells and/or egg breaking devices after the contents have been discharged under the influence of gravity. The albumen collection unit has at least one collection member with at least one opening adapted for allowing the passage of a fluid and at least one cover member adapted for covering the opening(s) in the collection member(s). The collection member(s) and/or the cover member(s) are moveable between a first mutual position where the cover member(s) cover(s) the opening(s) and a second mutual position where the opening(s) is/are uncovered.

20 Claims, 6 Drawing Sheets

(56) References Cited

U.S. PATENT DOCUMENTS

| | | | |
|---|---|---|---|
| 3,420,743 | A | 1/1969 | Sandhage et al. |
| 4,321,864 | A | 3/1982 | Willsey |
| 4,344,359 | A | 8/1982 | Frechou et al. |
| 4,764,387 | A * | 8/1988 | Willsey ................ A23J 1/09 99/582 |
| 4,773,322 | A | 9/1988 | Willsey |
| 4,919,042 | A * | 4/1990 | Rasmussen ............ A23J 1/09 99/497 |
| 5,628,246 | A | 5/1997 | Kristensen |

FOREIGN PATENT DOCUMENTS

| | | | |
|---|---|---|---|
| CN | 106234753 | A | 12/2016 |
| FR | 2038079 | A1 | 1/1971 |
| JP | S59210847 | A | 11/1984 |
| JP | H0928302 | A | 2/1997 |
| JP | 2009082808 | A | 4/2009 |
| KR | 20180017999 | A | 2/2018 |
| RU | 220767 | A1 | 7/2012 |
| SU | 96742 | A1 | 11/1953 |
| WO | 2007095943 | A1 | 8/2007 |
| WO | 2018012972 | A1 | 1/2018 |

OTHER PUBLICATIONS

English translation of Russian Search Report received in RU Application No. 2022120178/10, dated Mar. 22, 2023.
Notification of Reason for Rejection, dated Nov. 21, 2023, 3 pages, issued in Japanese Patent Application No. 1 2022-545862.

* cited by examiner

EGG BREAKING APPARATUS AND A METHOD FOR INCREASING THE YIELD OF AN EGG BREAKING PROCESS

CROSS-REFERENCE TO RELATED APPLICATIONS

This application is the national phase of, and claims priority to, International Application No. PCT/DK2020/050031, filed Feb. 7, 2020.

FIELD OF THE INVENTION

The disclosure relates generally to mechanical devices and methods for using such mechanical devices. More specifically, the disclosure relates to an egg breaking apparatus and methods for increasing the yield of an egg breaking process, e.g., using the egg breaking apparatus disclosed herein.

SUMMARY

The invention relates to an egg breaking apparatus for breaking eggs having shell and contents including yolk and albumen, comprising: a plurality of egg breaking devices, each adapted for holding, breaking and opening a single egg at a time, where said egg breaking devices are adapted for moving along a direction of travel during the breaking and opening of the eggs, and where said egg breaking devices are arranged in a plurality of columns each extending substantially perpendicular to the direction of travel and in a plurality of rows extending in the direction of travel of the egg breaking devices; at least one breaking activator adapted for activating each egg breaking device to break and open an egg held by it; at least one egg contents receiving device for receiving the contents of eggs broken and opened by the egg breaking devices, said contents being discharged from the shell under the influence of gravity; and an albumen collection unit for collecting albumen remaining on shells and/or egg breaking devices after the egg contents have been discharged under the influence of gravity, said albumen collection unit comprising at least one collection member with at least one opening adapted for allowing the passage of a fluid, said opening(s) being provided in an outer surface of the collection member(s). Such an egg breaking apparatus is often provided with a plurality of egg contents receiving devices each adapted for receiving the contents of one egg at a time, said egg contents receiving devices possibly being capable of separating the yolk of the egg from the albumen. The apparatus may, however, also be designed for the production of a whole egg product and have only one or a few common egg receiving devices, such as a tray or container, arranged at the bottom of the apparatus. The invention relates to all such apparatuses independent of the number of egg contents receiving devices.

The invention further relates to a method for increasing the yield of an egg breaking process.

BRIEF DESCRIPTION OF THE DRAWINGS

In the following the invention will be described in more detail with reference to embodiments shown in the drawings, where.

DETAILED DESCRIPTION

Methods and apparatus similar to that described herein are known from U.S. Pat. No. 5,628,246 and have proven to work very well when it comes to collecting a high percentages of the contents of the eggs. The resulting albumen product, however, cannot be approved for human consumption under the relatively strict rules presently applying for example in the USA. As the process furthermore consumes a lot of energy, it is rarely profitable.

It is therefore an object of the invention to provide an improved apparatus for collecting the albumen remaining on the shells and/or on the egg breaking devices, and another object of the invention to provide a method, which allows the albumen remaining on the shell and/or on the egg breaking device after the contents have been discharged under the influence of gravity to be collected in manner, which is more efficient and which will preferably also allow the albumen product to be approved for human consumption in a wider range of jurisdictions.

According to a first aspect of the invention the first object is achieved with an egg breaking apparatus, where the albumen collection unit further comprises at least one cover member adapted for covering the opening(s) in the collection member(s), and where the collection member(s) and/or the cover member(s) are moveable between a first mutual position where the cover member(s) cover(s) the opening(s) and a second mutual position where the opening(s) is/are uncovered.

The term "fluid" is used as a generic term including both liquids and gases, including ambient air and other mixtures. At present it is considered advantageous to use ambient air and to establish an inwards flow through the opening(s) into the collection member(s) by applying an under-pressure to the interior of the collection member(s). Other examples include the use of a purified gas or sterilized water, which is advantageously ejected from the opening(s) in the collection member(s) so that it acts as an air knife or a water jet cutter.

In this context the term "cover" does not necessarily mean that the opening(s) is/are totally closed, it may be sufficient that the cover member(s) is/are positioned in such a manner relative to the collection member(s) that the fluid flow through the at least one opening in the at least one collection member is partially interrupted when compared to the second mutual position. Likewise, the term "uncovered" is not to be understood as implying that no part of the cover member(s) can be overlapping the opening(s), only that a larger part of the opening(s) is available for serving as a fluid passage than in the first mutual position and that this available opening area is sufficient to achieve the needed fluid flow volume. In fact, letting the cover member(s) cover part of the opening(s) even when in the second mutual position may be used for regulating the fluid flow in response to different production requirements.

A further or supplemental regulation of the fluid flow through the opening(s) may be achieved by providing a fluid regulator adapted for regulating the amount of fluid supplied to/extracted from the collection member. This fluid regulator may for example be a valve regulating an amount of air being blown into or sucked out of the collection member, or a frequency convertor on a pump.

For the sake of simplicity, reference will be made to "the collection member" and "the covering member" in the following, even though an apparatus with several collection members and/or more than one cover member associated with the/each collection member is also within the scope of the invention. It is thus to be understood that unless otherwise stated a reference to the "the collection member" or "the cover member" does not exclude the presence of more one such member, and similar considerations apply to the opening, where a reference to "the opening" does not exclude the presence of a group or series of openings.

The movement between the first mutual position and the second mutual position may be achieved by moving the collection member in relation to the cover member or vice versa or by moving both of them in relation to each other, either synchronously, overlapping in time, or one after the other. To achieve such movement the collection member(s) may be adapted for being rotated, swung or displaced in relation to the cover member(s), and/or the cover member(s) may be adapted for being rotated, swung or displaced in relation to the collection member(s). Even though the mutual movement of the collection member and the cover member in relation to each other will be referred to as a back and forwards movement in the description of some embodiments below, it is to be understood that relative movement may be a unidirectional rotating movement. For example, the cover member may rotate about the collection member in one direction only, so that it is brought into the second position each time a full rotation has been completed. In another example, a half rotation results in the collection member and the cover member being in the second relative position by openings being provided on two opposite sides of the cover member. The rotation may be continuous and timed with the operational speed of the rest of the apparatus or intermittent.

If the cover member and the collection member move relatively close to each other during the mutual movement and if the cover member is embodied appropriately, the cover member may be used for removing remains from the surface of the collection member during the movement. Particularly, it is envisaged that an inner surface of the cover member facing the collection member is substantially at level with the outer surface of the collection member and covers the opening substantially entirely when in the first position so that the cover member may scrap albumen and other remains, such as chalaza and shell fragments, off the outer surface of the collection member. For this purpose the cover member may be made with an edge of a stiff material passing closely over the outer surface of the collection member during movement from the second position and back towards the first position. In another embodiment the cover member is provided with an edge of a softer material, which is in direct contact with the surface of the collection member and thus wipes off residue albumen et cetera.

It is, however, also possible for the cover member(s) to be arranged on the inner side of the collection member, so that the outer surface of the cover member is adjacent to an inner surface of the collection member. This may provide a good protection of the cover member and any moveable parts associated with it.

In a specific embodiment of the invention, the collection member is a pipe with a substantially circular cross-sectional shape, which is mounted so that it can be turned about its length axis, and the cover member is a stationary plate, which is curved so that it follows the shape of the inner surface of the collection member. When the collection member is turned, the openings move in over the cover member. If the collection member and cover member are adjusted appropriately in relation to each other any albumen and other remains present on the surface of the cover member can be scraped off as described above.

Removing albumen during the mutual movement will not only increase the yield of the process but will also contribute to preventing unintentional blockage of the opening(s) caused by albumen residues, chalaza and shell fragments.

The mutual movement of the cover member and the collection member between the two positions may also be used for mechanically cutting the chalaza or a string of the albumen still connected to the egg shell halves or to the egg breaking device.

In order to support the scraping and/or cutting effect of the cover member described above it may be advantageous to use two cover members, which are moved towards each other so as to function like a pair of scissors cutting the chalaza or string of albumen.

Scraped or cut off albumen may either drop off onto a collection tray underneath, which will particularly be the case when the cover member is on the outer side, or be sucked into the openings in the collection member once the albumen collection unit is back in the second mutual position, where the openings are uncovered.

During tests it has been discovered that the size and position of the openings and their total surface area is of importance both with respect to the energy consumption of the apparatus and the quality of the albumen product produced.

Specifically, it has been found to be advantageous to use a series of openings extending substantially perpendicular to the direction of travel of the egg breaking devices, and where each opening of the series is preferably arranged below a row of egg breaking devices. This allows the amount of fluid used for collecting the albumen to be kept at a minimum as it is only applied locally, where it is most needed. If using a liquid, this means that the amount of liquid potentially ending up in the albumen product is kept at a minimum. If using ambient air, the energy consumption will be comparatively low and the foam formation may be reduced.

The number of openings in the series will typically correspond to once, twice or three times the number of egg breaking devices in each column. If using two openings for each row, they may be arranged underneath each half shell of the broken egg or in continuation of each other in the direction of travel of the egg breaking devices. It is of course also possible to use two separate albumen collection units arranged one after the other in the direction of travel of the egg breaking devices, which will both provide an extra possibility for recovering albumen and allow the process to continue running even if one collection unit is defective.

An embodiment with a separate collection member for each row of egg breaking devices is also within the scope of the invention and will allow an easy replacement in case an opening is unintentionally blocked. The same applies to an embodiment with a separate cover member for each row of egg breaking devices and to the combination of these embodiments. When using an under-pressure in the collection member(s), it is, however, presently considered advantageous to use a collection member, which extends underneath several rows of egg breaking devices, preferably under at least half of the rows of egg breaking devices. With such an embodiment, the inside of the collection member may advantageously be embodied as a channel adapted for leading albumen sucked through the openings to an albumen receiving device.

In one embodiment the collection member(s) is/are connected to a vacuum source in a manner so that ambient air and possibly albumen can be drawn in through the openings. The albumen which comes loose from the egg shell halves and/or egg breaking devices under the influence of the vacuum can either be drained off along the outer side of the collection member and collected in a separate albumen receiving device, be allowed to drip directly into a receiving device, or be sucked through the opening and pass through the collection member to a receiving device.

In this embodiment, the provision of separate openings underneath the respective rows of egg breaking devices means that the amount of air drawn into the collection member is kept at a minimum, which has proven to have several advantages. Firstly, it is possible to use a considerably smaller vacuum pump than in the prior art apparatus known from U.S. Pat. No. 5,628,246 leading to a reduced size of the total apparatus. Secondly, the energy consumed by the vacuum pump is reduced and the same potentially applies to the noise generated by the pump. Thirdly, but perhaps most importantly, less air is mixed into the albumen product collected in the collection member, leading to a product with less foam. Less foam means that the product is more transparent and the presence of blood or other impurities are easier to discover, that the denaturation of the albumen associated with the formation of foam is reduced, and that the need for subsequent foam separation or settling is reduced.

In another embodiment, a fluid, such as for example ambient air or sterilized water, is sprayed from the openings, which thus serves as nozzles of a fluid cutter. Such nozzle openings may be adapted for providing a stationary jet, a moving jet or an intermittent jet of fluid and the jet may be linear, cone-shaped, fan-shaped or have any other shape depending on demand. If using only a single opening, the fluid cutter would have to extend over the width of the collection member in parallel with the columns of egg breaking devices, possibly even over the entire width of the apparatus.

The albumen which is cut loose from the egg shell halves and/or egg breaking devices under the influence of the fluid from the fluid cutter can either be drained off along the outer side of the collection member and collected in a separate albumen receiving device or be allowed to drip directly into a receiving device.

Pipes or tubes for supplying fluid to the nozzle openings of the fluid cutter can be provided inside the collection member or in connection therewith.

Using gas rather than a liquid in the fluid cutter has the advantage that the risk of intermixing the fluid with the albumen is comparatively low, but care should be taken to avoid increased foam formation.

The size and shape of the opening(s) will depend on if they are to serve as fluid cutter nozzles or vacuum nozzles as also explained above. In the case of using vacuum, it is presently considered advantageous that the total surface area of the opening(s) at level with the outer surface of the collection member is 20 mm$^2$ to 100 mm$^2$ per egg breaking device in each column, preferably 30 mm$^2$ to 60 mm$^2$ per egg breaking device in each column, and still more preferred approximately 40 mm$^2$ per egg breaking device in each column when the apparatus is to be used for processing hens eggs. With this size it is possible to achieve a balance where both foam formation and the risk of unintentional blockage of the openings are kept at a minimum.

As explained above, separate openings may be provided at each row of egg breaking devices and the provision of such openings include the provision of groups of openings, such that each egg breaking device passes over several openings. For example, two openings may be arranged in continuation of each other such that albumen not collected at a first opening may be collection at a second opening, where the type of fluid, fluid flow volume and/or fluid flow direction is different than at the first opening. It is also possible to arrange an openings underneath each of the egg shell halves resulting from the opening of the egg, and if combining these two embodiments openings may be arranged in a two-by-two configuration, where all four openings contribute to collecting albumen from the same egg.

According to a second aspect of the invention the second object is achieved with a method, where at least one cover member is caused to cover the opening(s) in the collection member(s) at least partially at intervals by moving the collection member(s) and/or the cover member(s) back and forth between a first mutual position where the cover member(s) cover(s) the opening(s) and a second mutual position where the opening(s) is/are uncovered.

This mutual movement of the collection member and cover member may be performed each time an egg breaking device passes an opening. In this way the fluid passage is closed when one egg has passed and re-opened when a new egg is above the opening, so that fluid is only passing the opening when there is a potential for collecting albumen.

Uncovering the opening only when at least one opened egg is located above the collection member may reduce the amount of energy needed for driving the albumen collection unit and hence make the total process more efficient.

Another advantage of uncovering the opening only when broken eggs are located above the collection member can be a reduction in the dynamic loads affecting the albumen collected, which may in turn result in reduced foam formation. Reducing the foam formation eases both the inspection of the albumen and subsequent handling thereof as described above.

Still another advantage of the regular covering and uncovering of the opening is the scraping effect, which may remove albumen residue, chalaza, shell fragments and other remains from the collection member as described above.

As modern egg breaking apparatuses operate at very high speeds, it is, however, presently preferred that the cover member(s) is not brought back and forth between the first and second position each time an egg breaking device or column of egg breaking devices pass the collection member (s), but that the length of the intervals between bringing the cover member(s) into the first position is determined by the need for keeping the collection member(s) sufficiently clean. The specific length of the interval may depend on multiple factors, such as the age of the eggs, the quality of the eggs, and/or standards set by local food and health authorities, but an interval of in the range of 30 seconds to 2 minutes is presently contemplated. It should preferably be possible for an operator of the apparatus to adjust the length of the intervals in order to meet changes in the production speed or properties of the eggs being processed.

Alternatively, the movement may be performed every time a certain number of eggs have passed, utilizing the potential of the cover member to clean off any residue albumen and other remains from the collection member.

It is also possible to close the openings when there is a production stop.

When having several independent cover members and/or collection members it is usually preferred to activate them all simultaneously when a column of egg breaking devices passes above them, but it is also possible to control them individually. In such cases the opening can be uncovered only when the egg breaking device above it is actually holding an egg and/or if the quality of the egg has previously been approved as will be described in detail below.

As described above with reference to the first aspect of the invention, the mutual movement of the cover member and the collection member may be achieved by the collection member(s) and/or the cover member(s) being rotated, swung or displaced in relation to the other, and in one embodiment the cover member(s) is at level with an outer surface of the collection member when in the first mutual position and cover(s) the opening(s) substantially entirely so that the passage of fluid through the opening(s) is substantially blocked.

Other details about the properties of the cover member and collection member described above with reference to the apparatus according to the first aspect of the invention also applies to the method according to the second aspect of the invention. Likewise, the use of an apparatus described with reference to method according to the second aspect of the invention and apparatus features associated therewith will also apply to the apparatus according to the first aspect of the invention.

Specifically, it is envisaged that a vacuum source is used for providing an under-pressure in the collection member so that ambient air and possibly albumen is drawn in through the opening, at least when the collection member(s) and the cover member(s) are in their second mutual position, said under-pressure possibly being regulated by a fluid regulator providing an alternating under-pressure.

When using a vacuum source and processing hens' eggs, experiments have shown that a high yield and a high quality of albumen product can be achieved if the under-pressure in the collection member results in an air speed of 6-10 m/s at a distance of 10 mm above the/each opening.

The albumen product resulting from the method according to the invention will include less foam and is therefore well suited for being inspected, either automatically or by a human inspector, in order to allow removal of albumen not suitable for human consumption and/or egg yolk. Such an improved inspection may in itself result in a product, which can be approved for human consumption in a wider range of jurisdictions.

The albumen collected by the albumen collection unit may be considered as a separate product of the egg breaking process or, depending on local requirements, be mixed with an albumen product retrieved under the influence of gravity and collected in the egg contents receiving device(s).

In one embodiment, an individual egg contents receiving device is associated with each egg breaking device, but it is also possible to use a common egg receiving device receiving egg contents from several egg breaking devices, possibly even all egg breaking devices of the apparatus.

Experiments have shown that collection the albumen remaining on the shells can potentially increasing the albumen yield by up to 0.5%.

Figure 1:
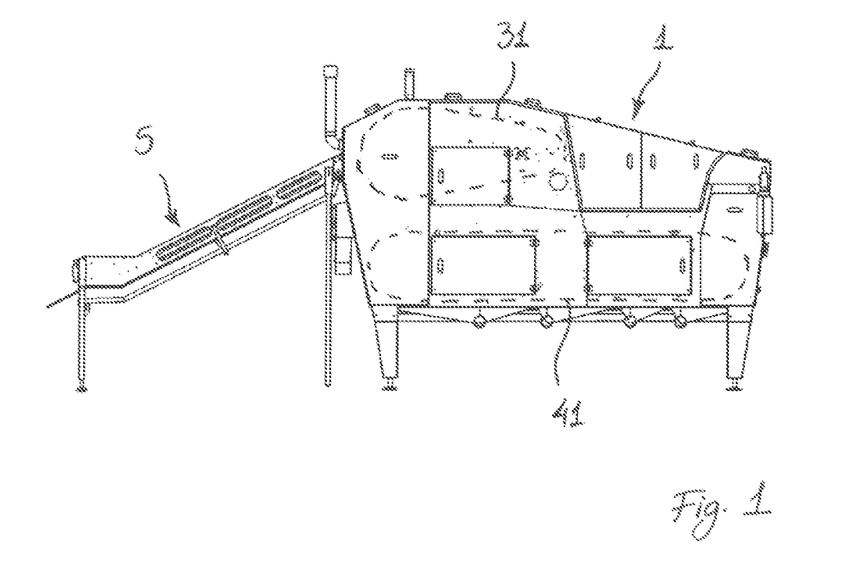
FIG. 1 is schematic sketch of an apparatus according to the invention seen from the side.

Referring now to the drawings, an egg breaking apparatus 1 with an egg infeed conveyor 5 is shown in FIG. 1. Inside it includes a plurality of egg breaking devices mounted on a first conveyor indicated by the broken line 31 in FIG. 1 and a plurality of egg contents receiving devices mounted on a second conveyor indicated by the broken line 41 in FIG. 1.

Figure 2:
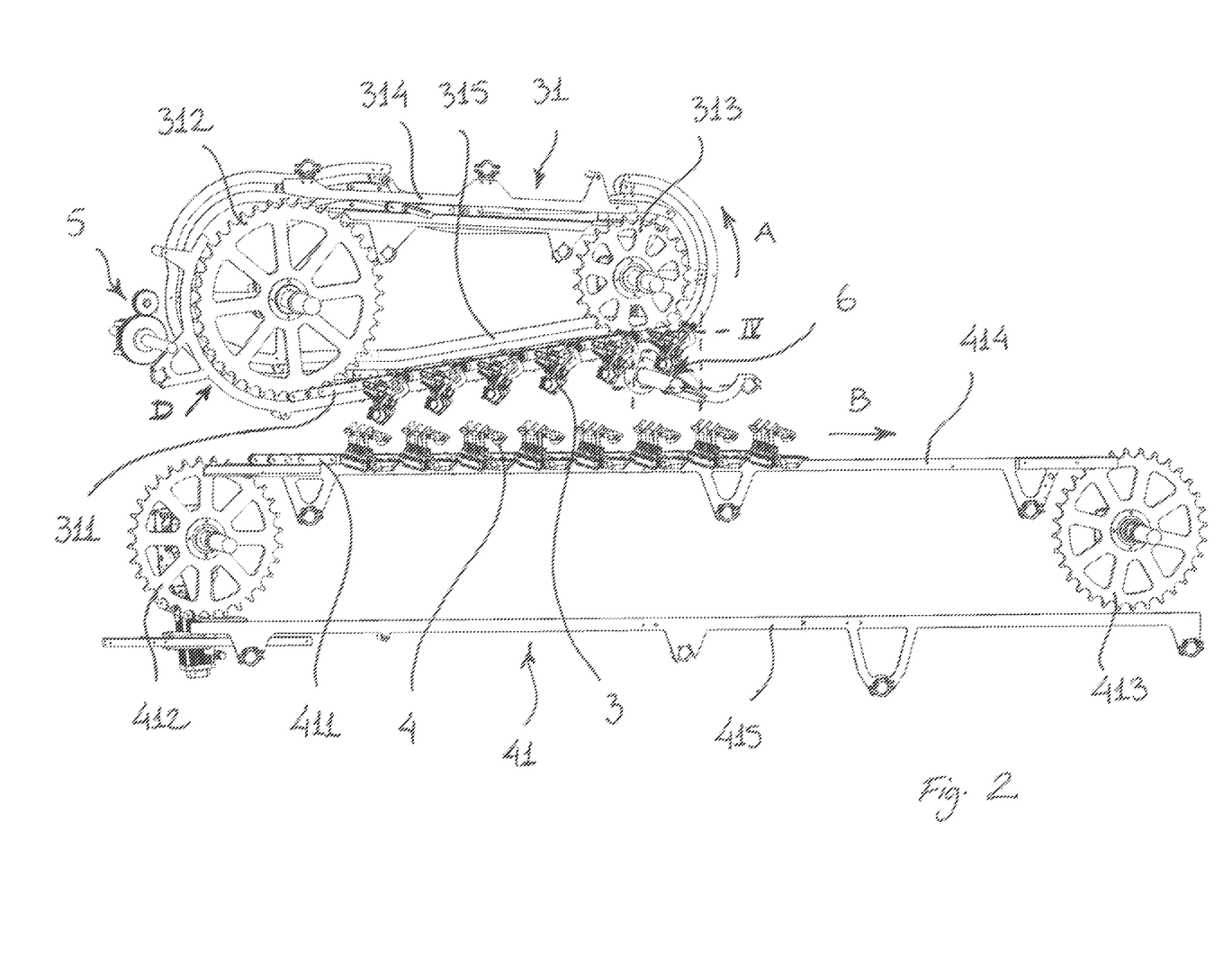
FIG. 2 is a perspective view of parts of the apparatus in FIG. 1.

FIG. 2 shows how egg breaking devices 3 and egg contents receiving devices 4 are mounted on the first and second conveyors 31, 41, which, in this embodiment, are both chain conveyors. The first conveyor 31 is adapted for moving along a direction of travel A, and the second conveyor 41 is adapted for moving along a direction of travel B.

Only a section 311 of the chain carrying the egg breaking devices 3 is shown, but it will be understood that the chain is an endless chain extending between the two wheels driving 312, 313 and along the guiding rails 314, 315. Likewise, the second conveyor is represented only by a section 411 of the chain carrying the egg contents receiving devices 4, even though the chain actually extends between the two wheels driving 412, 413 and along the guiding rails 414, 415. It is also to be understood that even though only a few egg receiving devices 4 are shown in FIG. 2, egg receiving devices are distributed evenly along the second conveyor 41 and that egg breaking devices 3 are distributed evenly on the first conveyor 31. The egg receiving devices 4 are here shown in columns of three devices extending perpendicular to the plane of travel of the conveyors, and only a single egg breaking device 3 is shown in each column, even though a machine of the type shown will usually include a larger number of devices in each column, such as for example 18 or 24 devices in each column. The number of egg breaking devices 3 in each column will normally be the same as the number of egg receiving devices 4 in each column.

Each egg breaking device 3 is adapted for holding, breaking and opening a single egg at a time, and each egg contents receiving devices 4 for receiving the contents of eggs broken and opened by the egg breaking devices one at a time. It is, however, also possible to leave out the separate egg receiving devices 4 and instead provide one or a few common egg receiving devices (not shown) receiving egg contents from eggs broken by all of the egg breaking devices 3 or from a group of egg breaking devices. Such a common egg receiving device may for example be a container (not shown) arranged at the bottom of the egg breaking apparatus 1.

In a manner well-known to the skilled person, for example from WO2007/095943, eggs are delivered to the egg breaking devices 3 by the conveyor 5 and when the egg breaking devices pass a breaking activator at the position marked D in FIG. 2 it is activated to break the shell of the egg held by it and open it. The contents of the eggs including yolk and albumen is discharged from the shell under the influence of gravity to an egg receiving device 4 positioned below the egg breaking device at the time.

Egg breaking apparatuses of the type described above are well known to the skilled person and the construction and function with respect to the breaking of the eggs and collection of the contents in the egg receiving devices will therefore not be described in further detail.

Figure 3:
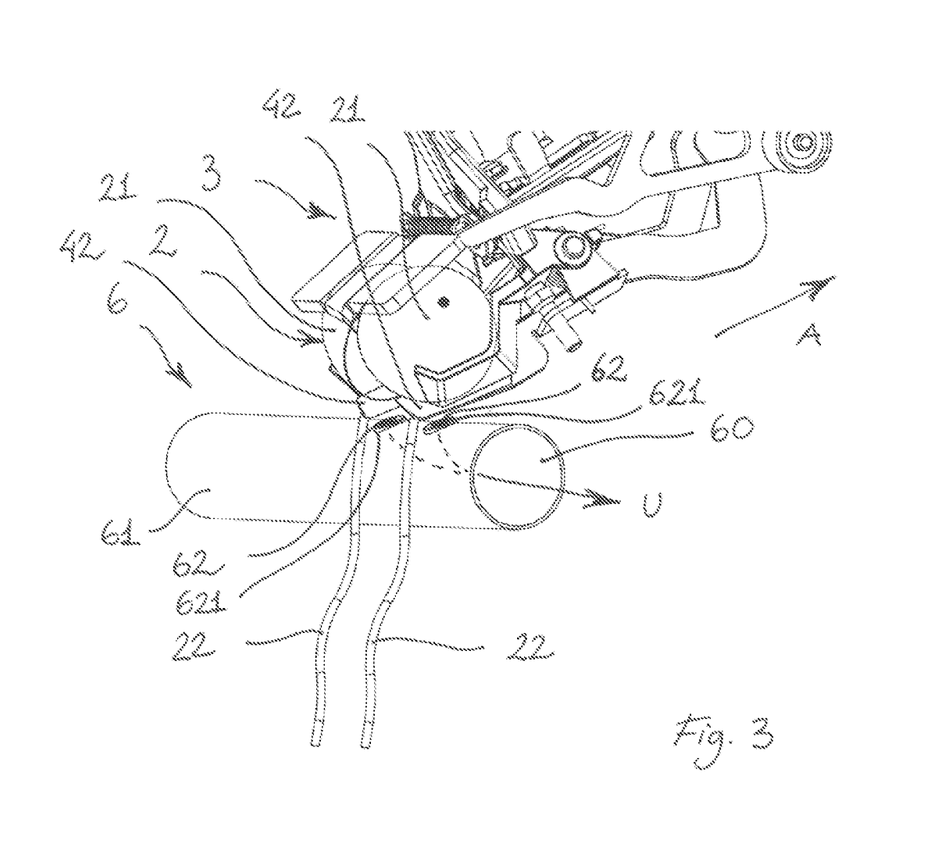
FIG. 3 shows a first embodiment of an albumen collection unit and an egg breaking device arranged above it.

The apparatus according to the invention further includes an albumen collection unit 6 as shown in FIG. 3 adapted for collecting albumen remaining on shells 21 of eggs 2 and/or on egg breaking devices 3 after the contents of the egg have been discharged to the egg receiving devices 4 under the influence of gravity.

The albumen collection unit 6 includes a circular cylindrical collection member 61 with two openings 62 in the outer surface. The hollow interior 60 of the collection member is connected to a vacuum source (not shown), such as a vacuum pump, which creates an under-pressure in the hollow interior. This entails that ambient air is being drawn in through the openings 62 and further through the hollow interior of the collection member as indicated by the arrow U in FIG. 3, thereby creating a downwards air flow above each opening 62.

When the egg breaking device 3 passes over the albumen collection unit 6 in the direction A, the two strings 22 of albumen and/or chalaza seen hanging from the egg shells 21 and/or clinging to the egg breaking device 3 will pass over the two openings 62 in the collection unit and be affected by the downwards airflow. This will result in a pull on the strings 22 of albumen and/or chalaza (hereafter only albumen for ease of reference), which will contribute to pulling them loose from the egg shells 21 and/or the egg breaking device 3. In this embodiment the openings 62 are provided with sleeves 621, which will reduce the risk of the strings 22 being sucked into the hollow interior 60 of the collection member 6, and most of the strings will therefore drop into an albumen receiving device located underneath the circular cylindrical collection member 61 as will be described later.

Above the invention has been described with reference to the use of vacuum, but it will be understood that it is also within the scope of the invention to provide pressurized fluid and to use this fluid for loosening or cutting strings 22 of albumen and/or chalaza. This can be done by providing an overpressure in a pipe-shaped collection member 61, which may for example be a cylindrical member as have been described above, and to make the opening(s) 62 sufficiently small to function as for example flat fan nozzles. Flat fan nozzles provide a flat jet of fluid, which, when oriented appropriately, can cut the string of albumen and/or chalaza. The sleeves 621 provided in the openings 62 in FIG. 3 may serve as nozzle inserts.

The pressurized fluid can be either a gas, such as ambient air, or a liquid, such as sterilized water. It is presently considered advantageous to use ambient air in order to avoid that the albumen product is mixed with other substances.

In this embodiment the collection member 61 is provided with two openings 62 underneath the path followed by each egg breaking device 3, each opening being arranged directly underneath each of the knife parts 42, which are used for opening the egg and holding on to the half egg shells 21 during emptying thereof. Strings 22 of albumen and/or chalaza often hang either one from each half egg shell 21 or one from each knife part 42, and the openings will thus be perfectly positioned for loosening each of these strings. It is, however, also possible to use only a single opening, which is centred below the egg breaking device. This may require a slightly higher fluid pressure, but as the number of openings can then be minimized and as a higher pressure may contribute to preventing blocking of the openings, it may be a preferable solution. It is also possible to provide several openings arranged in continuation of each other in the direction of travel A of the egg breaking devices 3 in order to increase the change of collecting albumen and/or chalaza, which clings strongly to the egg shell 21 or egg breaking device 3.

It is noted that while the invention is here described with reference to situations, where two separate strings of albumen are hanging from the egg shells 21 and/or the egg breaking device 3, the invention will also work where only a single string is present and where two strings adjoin below the egg breaking device.

Figure 4:
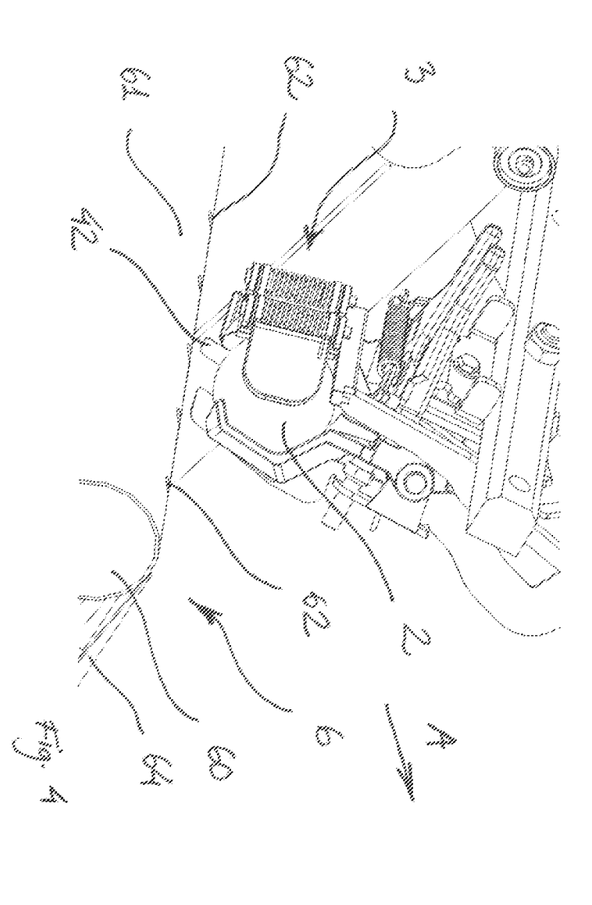
FIG. 4 is an enlargement of the section marked IV in FIG. 2 and, except for showing a different embodiment, it corresponds to FIG. 3.

A second embodiment of an albumen collection unit 6 is shown in FIG. 4, which is an enlargement of the section marked IV in FIG. 2 and where the same reference numbers as in FIG. 3 have been used for members having substantially the same function. In this embodiment, a series of openings 62 are provided at the upper side of the cylindrical collection member 61, pointing slightly more upwards than in FIG. 3, and the openings are without sleeves. The series of openings means that this collection unit is adapted for collecting albumen from a column of egg breaking devices 3, each row of egg breaking devices extending in the direction of movement A being associated with a pair of openings. It is to be understood the description given with reference to FIG. 3 above also applies to this embodiment and vice versa, meaning that the embodiment in FIG. 2 might also be provided with a series of openings.

The fact that the openings 62 in this embodiment is without sleeves increases the likelihood of albumen being drawn into the cylindrical collection member 61 and the hollow interior 60 is therefore connected to an albumen receiving device as will be described later.

Figure 5:
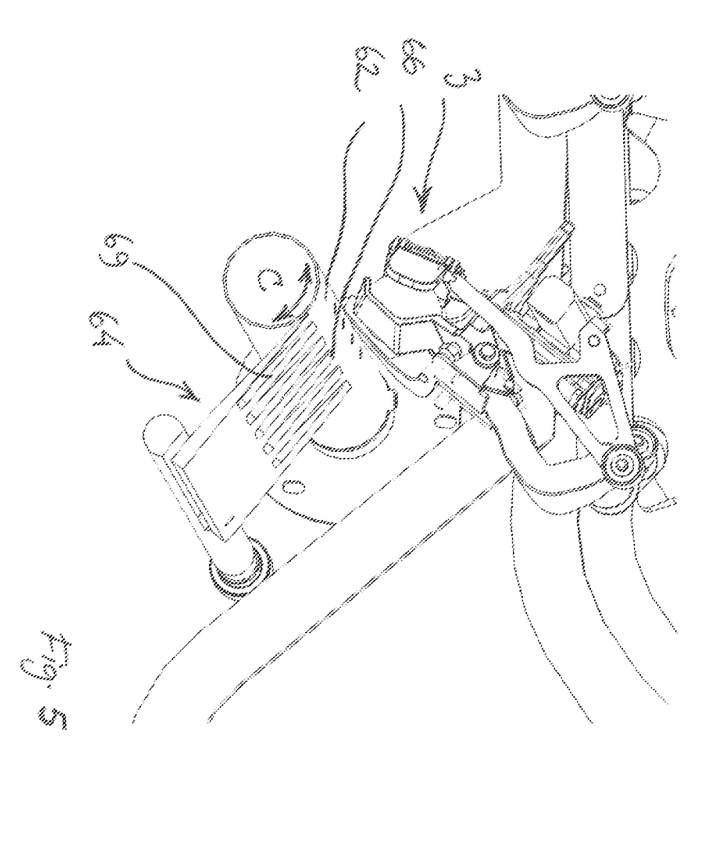
FIG. 5 shows the embodiment in FIG. 4 from another angle.

In the embodiment in FIGS. 4-5, each opening 62 is substantially circular and has a diameter of approximately 5 mm resulting in an effective opening area of approximately 40 mm$^2$. This total opening area per egg has been found to be applicable to all embodiments where an under-pressure is provided in the collection member and where the number of openings per egg does not exceed three. The opening diameter of 5 mm for circular openings has also been found to provide a good balance between the desire to keep the amount of ambient air sucked in through the openings at a minimum and at the same time keeping the risk of the openings becoming blocked at a minimum. Opening diameters of less than 2 mm are generally not considered to be expedient as the risk of blockage is then relatively high.

It is also possible to provide an elongate opening spanning underneath more than one egg breaking device, but this embodiment may not be preferred as it will have a comparatively large opening area and hence result in a high fluid volume passing the opening.

When using ambient air and creating an under-pressure in the collection member(s), it may be preferred to keep the total surface area of the opening(s) at level with the outer surface of the collection member below 50 mm$^2$ per egg breaking device in each column, and an air speed at a distance of 10 mm above the/each opening at 6-10 m/s.

If the apparatus includes a large number of rows and egg breaking devices 3, it may be advantageous to provide two separate albumen collection units 6, one at each side of the apparatus, so that each albumen collection unit will only have to collect albumen from half of the egg breaking devices. This will not only make it easier for a human inspector to inspect the albumen product, it will also make it easier to achieve a substantially uniform pressure at all openings of the collection member.

Referring now also to FIG. 5, the albumen collection unit 6 further includes a cover member 64 capable of covering the openings 62. The cover member 64 is moveable as shown by the double-arrow C from the first position covering the openings 62 to a second position where the opening is uncovered as shown in FIGS. 4 and 5.

When the egg breaking device 3 has passed the cylindrical collection member 61, the cover member 64 can be moved into its first position, so that the ambient air is not drawn into the collection member 61 while awaiting the arrival of the next egg breaking device 3. It is of course unavoidable that a small amount of ambient air is sucked into the collection member together with the albumen, but the movement of the cover member and the size of the opening 62 can be chosen such that the amount of air is kept at a minimum. It is also possible to keep the cover member 64 in the second position for as long as the machine is in operation and only brought into the first position during stops. It may be preferred that the cover member is brought into the first position at regular intervals so that the cover member may clean off any residue albumen and other remains on the outer side of the collection member as will be described further below.

The optimal size of the opening 62 depends on several factors, such as, for example, on the type of eggs processed and the age of the eggs, which influences the viscosity of the albumen, but may be determined by experiments. Making the opening slightly over-sized and allowing the cover member to cover it partially even when in the second position will allow for an adaptation of the effective opening size, even during operation of the apparatus.

The combined influence of the vacuum suction and gravity may be enough to cause the string 22 of albumen and/or chalaza to break, but if this does not happen, the string can be cut mechanically when the cover member 64 moves into the first position.

The inner surface of the cover member 64 facing the collection member 61 in FIGS. 4 and 5 is at level with the outer surface of the collection member. This not only means that the cover member covers the opening substantially entirely when in the first, closed position. It also means that the front edge 66 of the cover member moves closely along the outer surface of the collection member 61 or the sleeves, if any, during the movement between the first and second positions, thereby scraping any albumen, chalaza, shell fragments or other remains off the collection member. This contributes considerably to reducing the risk of the opening becoming blocked by such matter and hence contributes to a more reliable albumen collection unit.

In the embodiment shown in FIGS. 4 and 5 the cover member 64 has a comb-shape with one tooth 69 extending towards/over each of the openings 62 in the albumen collection member 6, but it is to be understood that other embodiments, including plate-shaped cover members are also possible.

Figure 6:
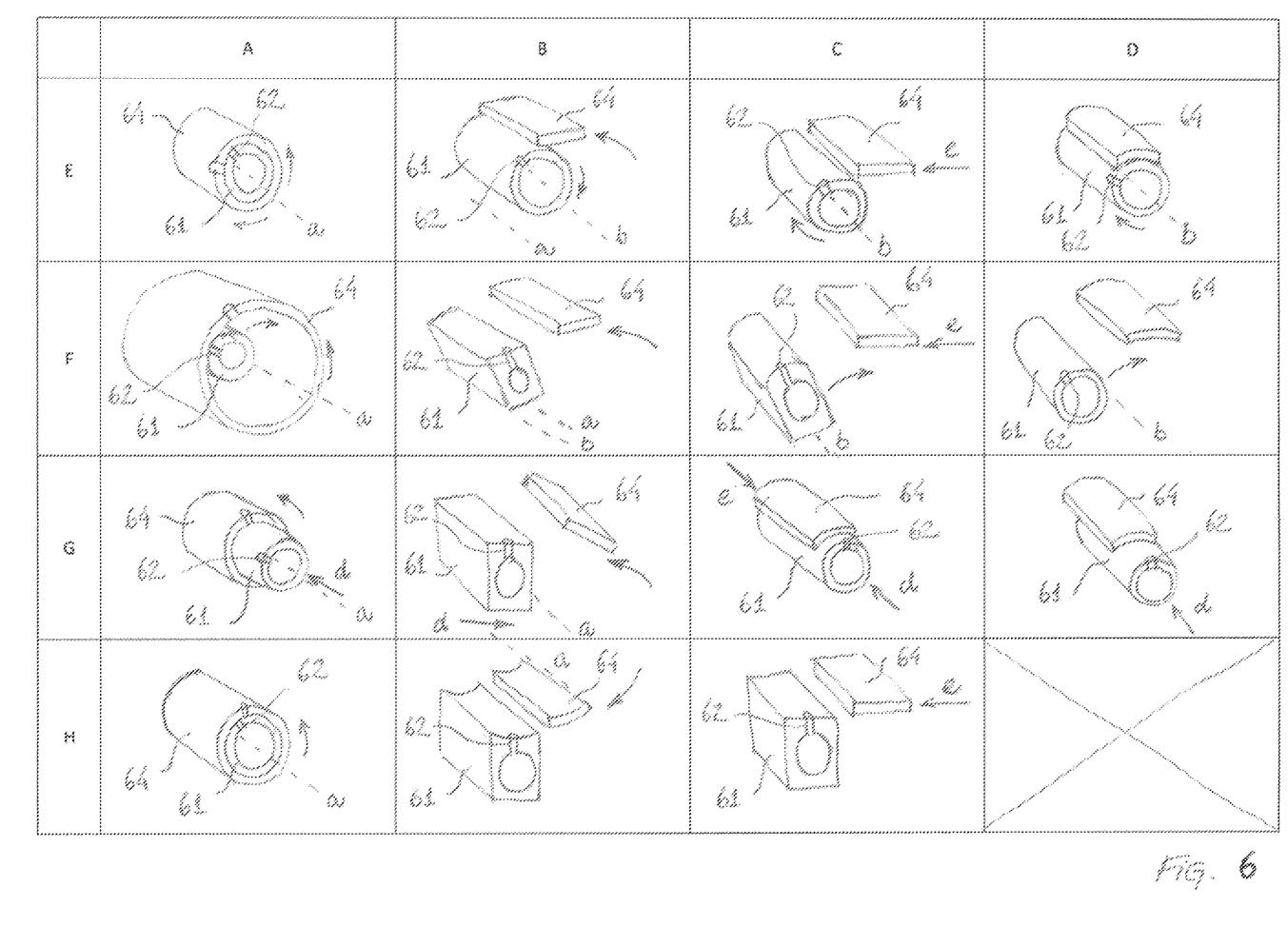
FIG. 6 is a matrix illustrating different possible patterns of movement of the collection member and cover member in relation to each other.

Generally speaking, a mutual movement between the cover member 64 and the collection member 61 can be achieved by rotating, swinging or displacing the cover member, by rotating, swinging or displacing the collection member, or by moving both the cover member and the collection member. FIG. 6 illustrates a few examples of how this may be embodied with a plate-shaped cover member.

Features having the same function have been given the same reference numbers in all embodiments of FIG. 6 as in FIGS. 1-5.

In FIG. 6, columns A, B, C and D show embodiments where the cover member 64 is rotated, swung, displaced and kept stationary, respectively, and rows E, F, G and H show embodiments where the collection member 61 is rotated, swung, displaced and kept stationary, respectively.

All embodiments are shown in a cross-sectional view and all collection members 61 have only a single opening 62, but the opening(s) may be embodied differently as will be explained in detail later. It is noted that the sketches in FIG. 6 are only intended as illustrations of the principle of mutual movement between the cover member 64 and collection member 61 and that the dimensions of the members shown are thus not necessarily suitable for use in an actual apparatus according to the invention. Moreover, it will be understood that the different shapes of the cover member 64 and collection member 61 shown in the different embodiments in FIG. 6 may be combined in other ways as long as the cover member is able to cover the opening(s) 62 in the collection member.

In column A the cover members 64 are all cylindrical and surrounding the collection members 61, so that the cover members can rotate about the axis a, either in one direction or in a back and forwards movement. The collection members 61 are also all cylindrical, but they are mounted in different ways. In row E the collection member 61 it is adapted to rotate about the axis a, either in one direction or in a back and forwards movement, in row F it is adapted for being swung about the axis a, in row G it is adapted for being displaced along the axis a as shown by the arrow d, and in row H it is stationary. Due to the fact that the cover members are here cylindrical, they do not provide the scraping effect described with reference to the front edge 66 of the cover member in FIGS. 1-5, but if the inner surface of the cover member is in close contact with the outer surface of the collection member the outer surface of the collection member will be well protected.

In columns B, C and D the cover members 64 each have the shape of a section of cylinder or a plate shape as in FIGS. 1-5 and thus may provide the scraping effect described above if the distance between the cover member 64 and the collection member 61 is chosen appropriately. In these embodiments the collection members 61 and the cover members 64 are shown in the second, open position, whereas the embodiments in column A were shown in the first, closed position.

In column B the cover members 64 are all adapted for being swung about an axis a. In row E the collection member 61 is cylindrical and adapted to rotate about the axis b, in row F it is of a rectangular cross-sectional shape and adapted for being swung about the axis b, in row G it is adapted for being displaced as shown by the arrow d, and in row H it is stationary with a concave upper surface. Making the outer surfaces, which are likely to come into contact with albumen, convex as in row E will allow the albumen to run off under the influence of gravity and drip into a collection tray (not shown in FIGS. 1-6) underneath the collection unit. A concave surface as the one in row G on the other hand will cause the albumen to run towards the opening in the collection member 61, which may be advantageous when using vacuum.

In column C the cover members 64 are all adapted for being displaced as shown by the arrow e. In row E the collection member 61 is cylindrical and adapted to rotate about the axis b, in row F it is of a substantially rectangular cross-sectional shape with a convex top surface and adapted for being swung about the axis b, in row G it is cylindrical and adapted for being displaced as shown by the arrow d, and in row H it is stationary and having a rectangular cross-section.

In column D the cover members 64 are stationary and the collection members 61 are all cylindrical. In row E the collection member 61 is adapted to rotate about the axis b, in row F it is adapted for being swung about the axis b, and in row G adapted for being displaced as shown by the arrow d.

The actual movement of the cover member 64 and/or collection member 61 may be achieved by attaching one or both ends of it/them to an actuator (not shown). If for example wishing to achieve a rotating movement of the collection member 61, a pin at the end of the collection member can be connected to an electrical motor rotating the pin and hence the collection member. Such mechanical connections to motors or like actuators are well known to the skilled person and will therefore not be described in further detail.

Figure 7:
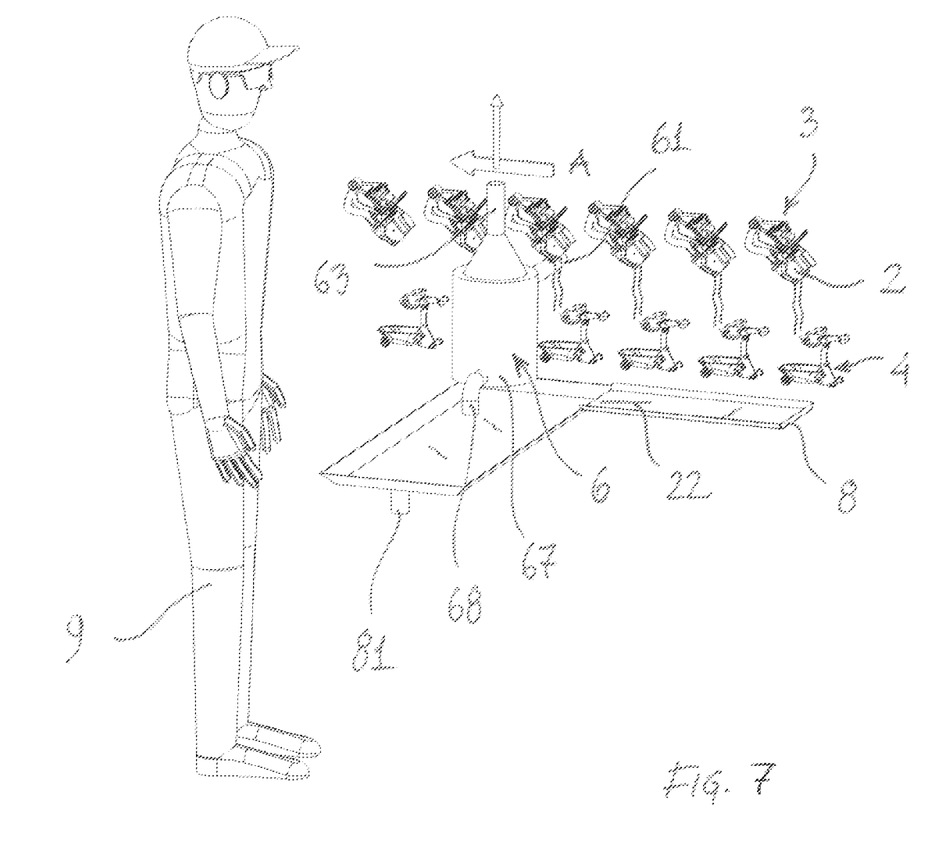
FIG. 7 shows selected parts of an apparatus according to the invention and a human operator in a perspective view.
Figure 8:
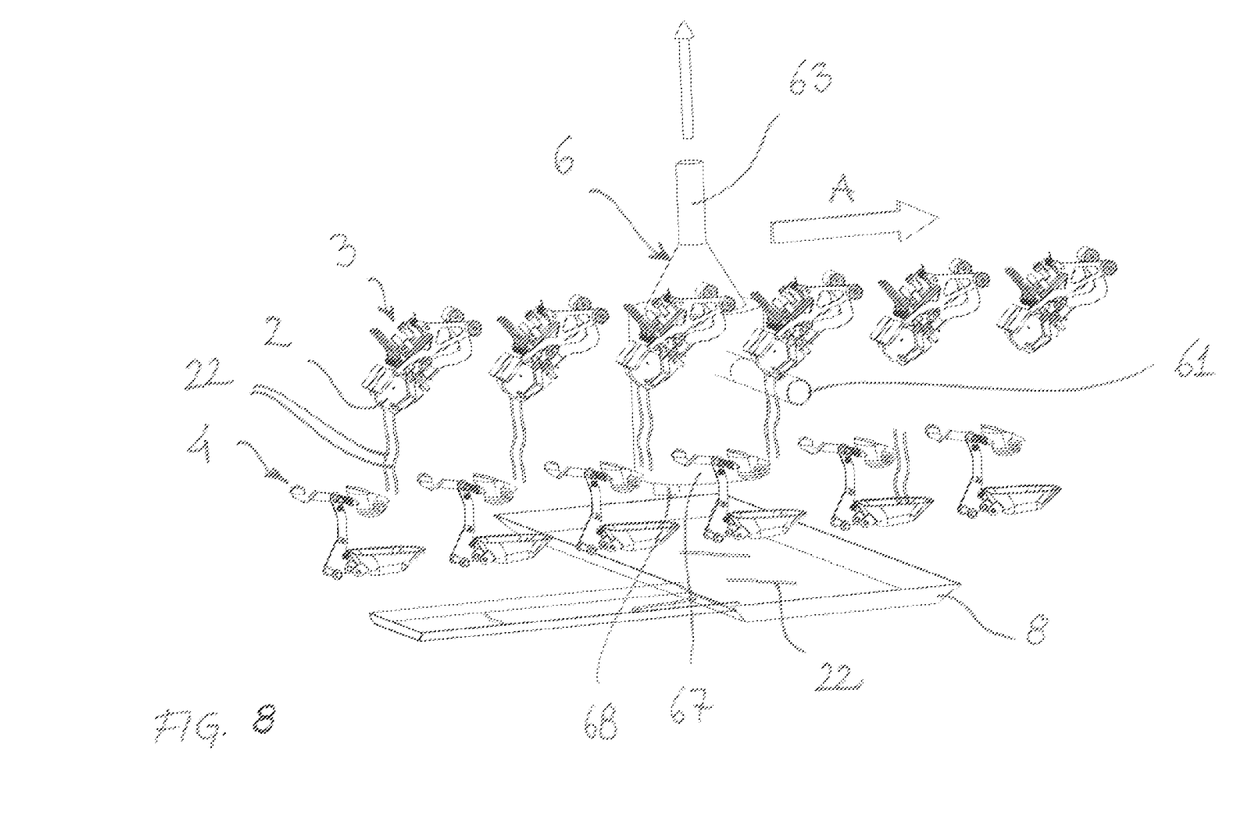
FIG. 8 shows the apparatus parts in FIG. 7 from a different angle.

Turning now to FIGS. 7 and 8, selected parts of an apparatus according to the invention are shown from two different angles. Here too the same reference numbers are used as in FIGS. 1-6 and features having the same reference numbers have the same function unless otherwise stated.

Egg breaking devices 3 carrying eggs 2 and egg receiving devices 4 are shown in rows above the other as in FIG. 2, and a collection tray 8 is provided underneath them for collecting strings 22 of albumen and/or chalaza, which come loose from the egg shell halves or from the egg breaking devices, but do not land in the egg receiving devices.

An albumen collection unit 6 here includes a collection member 61, a fluid connection pipe 63 adapted for being connected to a vacuum source, a settling tank 67 and a tank outlet 68. The tank outlet 68 is arranged above the collection tray 8 so that albumen can run out onto the collection tray, where it is inspected by a human inspector 9 before being discharged to an albumen receiving device, such as a storage tank (not shown), via a tray outlet 81. Human inspection is necessary in some jurisdictions in order to have the albumen product approved for human consumption, but it is also possible to connect the tank outlet 68 directly to a storage tank.

In the embodiment in FIGS. 7 and 8 the fluid connection pipe 63 is provided at the top of the tank 67 in order to prevent albumen from being sucked out via this pipe as and the albumen leaves the settling tank 67 under the influence of gravity via outlet 68. This means that if foam has formed on the collected albumen product it will tend to stay in the settling tank until the foam bubbles burst and that the product coming out through the tank outlet 68 will consist primarily of liquid albumen, which can more easily be inspected.

Above the invention has been described with reference to several different embodiments, and it is to be understood that features described with reference to these embodiments may be combined in different ways or replaced without necessarily departing from the scope of the claims.

The invention claimed is:

1. An egg breaking apparatus for breaking eggs having a shell and contents including yolk and albumen, the apparatus comprising:
    a plurality of egg breaking devices, each egg breaking device being adapted for holding, breaking and opening a single egg at a time, where said egg breaking devices are adapted for moving along a direction of travel during the breaking and opening of eggs, and where said egg breaking devices are arranged in a plurality of columns and rows, each column extending substantially perpendicular to the direction of travel of the egg breaking devices, and each row extending in the direction of travel of the egg breaking devices;
    at least one breaking activator adapted for activating each egg breaking device to break and open a respective egg held by a respective egg breaking device of the plurality of egg breaking devices;
    at least one egg contents receiving device for receiving the contents of eggs broken and opened by the egg breaking devices, said contents being discharged from the shells under the influence of gravity;
    at least one albumen collection unit for collecting albumen remaining on the shells and/or egg breaking devices after the egg contents have been discharged under the influence of gravity, said albumen collection unit comprising:
    at least one collection member, each of the at least one collective member having at least one opening adapted for allowing the passage of a fluid, said at least one opening being provided in an outer surface of the at least one collection member; and
    at least one cover member adapted for covering the at least one opening in the at least one collection member;
    wherein the at least one collection member and/or the at least one cover member are moveable between a first mutual position where the at least one cover member covers the at least one opening and a second mutual position where the at least one opening is uncovered.

2. The egg breaking apparatus according to claim 1, where at least one of the at least one collection member and the at least one cover member is adapted for being rotated, swung or displaced in relation to the other of the at least one collection member and the at least one cover member.

3. The egg breaking apparatus according to claim 1, where, when in the first mutual position, an inner surface of the at least one cover member facing the at least one collection member is substantially at level with the outer surface of the at least one collection member and covers the at least one opening substantially entirely.

4. The egg breaking apparatus according to claim 1, further comprising a series of openings extending substantially perpendicular to the direction of travel of the plurality of egg breaking devices, where each opening of the series is arranged below a row of egg breaking devices.

5. The egg breaking apparatus according to claim 4, where the number of openings in the series corresponds to once or twice the number of egg breaking devices in each column.

6. The egg breaking apparatus according to claim 1, where a single collection member extends underneath several rows of egg breaking devices.

7. The egg breaking apparatus according to claim 1, where the at least one collection member is connected to a vacuum source such that ambient air and possibly albumen can be drawn in through the at least one opening.

8. The egg breaking apparatus according to claim 1, where the total surface area of the at least one opening at level with the outer surface of the at least one collection member is 20 mm$^2$ to 100 mm$^2$ per egg breaking device in each column.

9. The egg breaking apparatus according to claim 1, where the egg breaking apparatus further comprises a fluid regulator adapted for regulating the amount of fluid supplied to/extracted from the collection member.

10. The egg breaking apparatus according to claim 1, wherein the at least one egg contents receiving devices comprises a plurality of egg contents receiving devices, each egg contents receiving device being adapted for receiving the contents of one egg at a time.

11. A method for increasing the yield of an egg breaking process, comprising:
    feeding eggs, each egg having a shell and contents including yolk and albumen, to a plurality of egg breaking devices, each egg breaking device being adapted for holding, breaking and opening a single egg at a time, where said egg breaking devices move along a direction of travel during the breaking and opening of the eggs and where said egg breaking devices are arranged in a plurality of columns each extending substantially perpendicular to the direction of travel and in a plurality of rows extending in the direction of travel of the egg breaking devices;

activating, via at least one breaking activator, the egg breaking devices to break and open the eggs;

receiving the contents of the eggs broken and opened by the egg breaking devices into at least one egg contents receiving devices, said contents being discharged from the shells under the influence of gravity;

collecting albumen remaining on the shells and/or egg breaking devices after the contents have been discharged under the influence of gravity into an albumen collection unit by passing a fluid through at least one opening provided in an outer surface of at least one collection member in order to separate strings of albumen from the shells; and causing at least one cover member to cover the at least one opening in the at least one collection member at least partially at intervals by moving the at least one collection member and/or the at least one cover member back and forth between a first mutual position where the at least one cover member covers the at least one opening and a second mutual position where the at least one opening is uncovered.

12. The method according to claim 11, where the at least one collection member and/or the at least one cover member is moved from the first mutual position to the second mutual position and back to the first mutual position every time a column of egg breaking devices passes the collection member or at an interval of 30 seconds to 2 minutes.

13. The method according to claim 11, where the at least one collection member and/or the at least one cover member is rotated, swung or displaced in relation to the other.

14. The method according to claim 11, where the at least one cover member is used for removing albumen residue, chalaza and/or shell fragments from the outer surface of the collection member during movement between the first and the second mutual positions.

15. The method according to claim 11, where a vacuum source is used for providing an under-pressure in the collection member so that ambient air and possibly albumen is drawn in through the opening, at least when the at least one collection member and the at least one cover member are in their second mutual position.

16. The method according to claim 15, where, at least when the at least one collection member and the at least one cover member are in their second mutual position, the under-pressure in the at least one collection member results in an air speed of 6-10 m/s at a distance of 10 mm above the at least one opening.

17. The egg breaking apparatus according to claim 1, where a single collection member extends underneath at least half of the rows of egg breaking devices.

18. The egg breaking apparatus according to claim 8, where the total surface area of the at least one opening at level with the outer surface of the at least one collection member is 30 mm$^2$ to 60 mm$^2$ per egg breaking device in each column.

19. The egg breaking apparatus according to claim 18, where the total surface area of the at least one opening at level with the outer surface of the at least one collection member is approximately 40 mm$^2$ per egg breaking device in each column.

20. The egg breaking apparatus according to claim 1, wherein the at least one egg contents receiving devices comprises one common egg receiving device arranged at a bottom of the apparatus.

* * * * *